(12) United States Patent
Vanover et al.

(10) Patent No.: US 10,237,416 B2
(45) Date of Patent: Mar. 19, 2019

(54) DISTRIBUTED NETWORK DATA USAGE METERING ACROSS AUTHORIZED PERSONAL DEVICES

(71) Applicant: Lenovo (Singapore) Pte. Ltd., Singapore (SG)

(72) Inventors: Michael Terrell Vanover, Raleigh, NC (US); Howard Locker, Cary, NC (US); Yaqiang Wu, Beijing (CN)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/885,275

(22) Filed: Oct. 16, 2015

(65) Prior Publication Data

US 2017/0111517 A1   Apr. 20, 2017

(51) Int. Cl.
| | | |
|---|---|---|
| H04M 11/00 | (2006.01) | |
| H04M 15/00 | (2006.01) | |
| H04L 12/825 | (2013.01) | |
| H04W 4/24 | (2018.01) | |
| H04W 88/04 | (2009.01) | |
| H04W 8/00 | (2009.01) | |

(52) U.S. Cl.
CPC .......... *H04M 15/58* (2013.01); *H04L 47/25* (2013.01); *H04W 4/24* (2013.01); *H04W 8/005* (2013.01); *H04W 88/04* (2013.01)

(58) Field of Classification Search
CPC ......... H04W 4/24; H04W 4/26; H04W 88/06; H04W 8/18; H04W 88/04; H04W 4/008; H04W 28/02; H04L 12/1435; H04L 43/0876; H04L 12/1417; H04L 47/20; H04L 12/14

USPC ............ 455/7–25, 405–408, 63.2, 443, 444; 370/389, 400, 406, 338
See application file for complete search history.

(56) References Cited

U.S. PATENT DOCUMENTS

| | | | | |
|---|---|---|---|---|
| 2011/0302077 | A1* | 12/2011 | Lundgren | G06Q 20/10 705/39 |
| 2012/0026992 | A1* | 2/2012 | Navda | H04W 4/003 370/338 |
| 2012/0240197 | A1* | 9/2012 | Tran | H04L 63/1416 726/4 |
| 2013/0148568 | A1* | 6/2013 | Iimori | H04W 40/02 370/315 |
| 2013/0196618 | A1* | 8/2013 | Zalmanovitch | H04L 43/045 455/405 |
| 2016/0007394 | A1* | 1/2016 | Hassan | H04W 76/022 455/450 |

* cited by examiner

*Primary Examiner* — Ronald Eisner
(74) *Attorney, Agent, or Firm* — Ference & Associates LLC

(57) ABSTRACT

One embodiment provides a method, including: establishing, using a wireless wide area network (WWAN) device of an electronic device, a WWAN connection; communicating, using the WWAN device, data over the WWAN connection; tethering, using the WWAN device and a wireless local area network (WLAN) device of the electronic device, another user device; communicating, using a processor of the electronic device, data according to the tethering; and determining, using a processor of the electronic device, a separate data usage value for data communicated over the WWAN for the another user device. Other aspects are described and claimed.

26 Claims, 7 Drawing Sheets

DISTRIBUTED NETWORK DATA USAGE METERING ACROSS AUTHORIZED PERSONAL DEVICES

BACKGROUND

Electronic devices such as laptops, tablets, and smart phones connect to communication networks to send and/or receive data, e.g., files, web pages, streaming media, etc. Various communication networks exist. For example, local area networks (LANs) (including wireless LANs, "WLANs") are available and conventionally have been utilized to connect to the Internet. Conventionally desktops and laptops connected to the Internet as a communication network, e.g., via a wireless access point that connects a laptop via a WLAN connection (also referred to as "Wi-Fi®" connection). Wi-Fi is a registered trademark of the Wi-Fi Alliance in the United States and other countries.

Smart phones, in addition to a WLAN capability, often include other communication capabilities. Among these is a wireless wide area network (WWAN) communication capability and short range wireless communication capabilities (e.g., BLUETOOTH wireless communication, near field communication, radio frequency identification (RFID) communication, etc.). BLUETOOTH is a registered trademark of Bluetooth SIG, Inc., in the United States and other countries.

Use of a smart phone or tablet device, i.e., a device capable of connecting to a WWAN, to act as a hotspot or tethering device is known. In this case, a first device capable of communicating, e.g., via a WWAN, such as a 4G telecommunications network, acts as a connection point through which another device (e.g., laptop personal computer, etc.) may send and receive data. This process is referred to as tethering, whereby a device such as a smart phone acts to tether another device, e.g., a laptop, to a network, e.g., a WWAN, facilitating network connectivity for the laptop via a network type with which it normally does not communicate. The tethering is accomplished by virtue of the smart phone connecting to the WWAN and in turn to the laptop, e.g., via a WLAN connection. The laptop can then send and receive data via the smart phone through the WWAN connection to the broader network.

BRIEF SUMMARY

In summary, one aspect provides a method, comprising: establishing, using a wireless wide area network (WWAN) device of an electronic device, a WWAN connection; communicating, using the WWAN device, data over the WWAN connection; tethering, using the WWAN device and a wireless local area network (WLAN) device of the electronic device, another user device; communicating, using a processor of the electronic device, data according to the tethering; and determining, using a processor of the electronic device, a separate data usage value for data communicated over the WWAN for the another user device.

Another aspect provides an electronic device, comprising: a processor; a wireless wide area network (WWAN) device operatively coupled to the processor; a wireless local area network device (WLAN) operatively coupled to the processor; a memory device comprising instructions executable by the processor to: establish, using the wireless wide area network (WWAN) device, a WWAN connection; communicate, using the WWAN device, data over the WWAN connection; tether, using the WWAN device and a wireless local area network (WLAN) device e, another user device; communicate data according to the tethering; and determine a separate data usage value for data communicated over the WWAN for the another user device.

A further aspect provides a product, comprising: a storage device having code stored therewith, the code being executable by a processor and comprising: code that establishes, using a wireless wide area network (WWAN) device of an electronic device, a WWAN connection; code that communicates, using the WWAN device, data over the WWAN connection; code that tethers, using the WWAN device and a wireless local area network (WLAN) device of the electronic device, another user device; code that communicates, using a processor of the electronic device, data according to the tethering; and code that determines, using a processor of the electronic device, a separate data usage value for data communicated over the WWAN for the another user device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
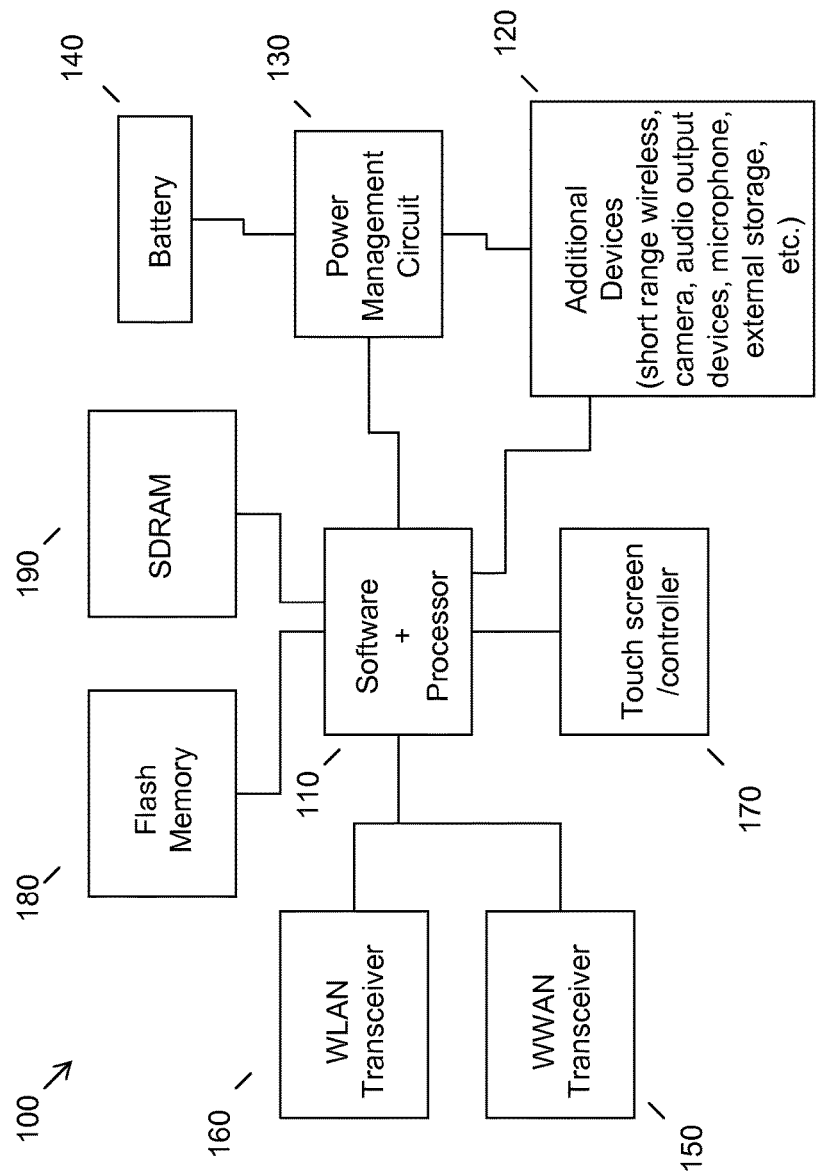
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventional tethering techniques offer a device, such as a laptop or desktop computer, that lacks a WWAN communication device (and hence the capability of connecting to a WWAN), the opportunity to nonetheless send and receive data via a WWAN by tethering with a smart phone. However, most users are unaware that they may use a smart phone or other WWAN capable device in such a fashion. Moreover, even if a user is generally aware of the concept of tethering, finding the appropriate interface and configuring the appropriate settings is cumbersome and in practice not possible for many users. Further, even if a user manages to properly tether devices, difficulties remain with respect to security and data transmission rates and amounts.

Accordingly, an embodiment automates the tethering process for a user's personal devices. Using an embodiment, a user completes a simple registration process to create a list of known devices that are permitted to participate in tethering. For example, a user may indicate that a personal laptop and/or tablet is/are permitted to tether via the user's smart phone to establish a WWAN connection.

After completion of this registration, an embodiment facilitates an automated tethering process to tether the user's device(s) automatically based on a policy. For example, an embodiment may determine that there is no available Wi-Fi® connection and automatically tether the user's laptop to the available WAN connection, i.e., available to the smart phone, e.g., also carried by the user. The tethered connection may be automatically established, secure (e.g., password protected, encrypted) and monitored (e.g., for data transmission rates and amounts), such that the user need not bother with cumbersome steps and related issues conventionally encountered with tethering. This permits all or a sub-set of the user's devices (at the user's discretion) to achieve network connectivity automatically based simply on proximity to a connected device. A smart phone centric description follows, as this is currently the device typically carried by a user offering the broadest network coverage (i.e., WWAN connectivity); however, it will be readily apparent to those having ordinary skill in the art that other devices may accomplish the processing attributed to the smart phone in the examples used herein.

In addition, an embodiment facilitates active synchronization of learned network communication details via an automated exchange of network connection data. By way of example, an embodiment facilitates the process by which an available Wi-Fi® connection is established, even if other user device(s) are not aware of the connection details required to establish the session. In an embodiment, this is facilitated via short range wireless communication to exchange WLAN details with trusted devices. This permits the user's devices to promote a Wi-Fi® first protocol, by which a Wi-Fi network connection known to any of the user's devices is shared across the user's devices, eliminating the need to use a WWAN connection (and potentially accruing unnecessary data charges).

An embodiment also permits a user to tether, via another device (e.g., his or her smart phone), a WWAN network connection without worrying that he or she will overrun or "max out" his or her data plan using the WWAN. By way of example, a user device (e.g., the user's smart phone) not only facilitates tethering of other user devices to the WWAN connection (e.g., a laptop that does not have a WWAN communication capability configured), but also monitors the network traffic such that the user is aware of how much WWAN data has been used, how quickly the WWAN data is being used, etc. The user may adjust his or her tethering policy settings as desired, but an embodiment may act to automatically warn a user that the data transmission is exceeding a predetermined rate, a predetermined amount, or both. This permits a user to be aware that they are using available WWAN data rapidly and/or are approaching a data rate or amount limit. An embodiment may take automatic actions based on the rate and/or amount of data that is transmitted, e.g., warning the user, throttling the user (with associated notification), terminating the WWAN connection, etc., for one or more devices, applications, etc.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a wireless wide area network (WWAN) transceiver 150 and a wireless local area network (WLAN) transceiver 160 for connecting to various networks, such as telecommunications networks (WAN) and wireless Internet devices, e.g., access points offering a Wi-Fi® connection. Additionally, devices 120 are commonly included, e.g., short range wireless communication devices, such as a BLUETOOTH radio, a BLUETOOTH LE radio, a near field communication device, etc., as further described herein. System 100 often includes a touch screen 170 for data input and display/rendering. System 100 also typically includes various memory devices, for example flash memory 180 and SDRAM 190.

Figure 2:
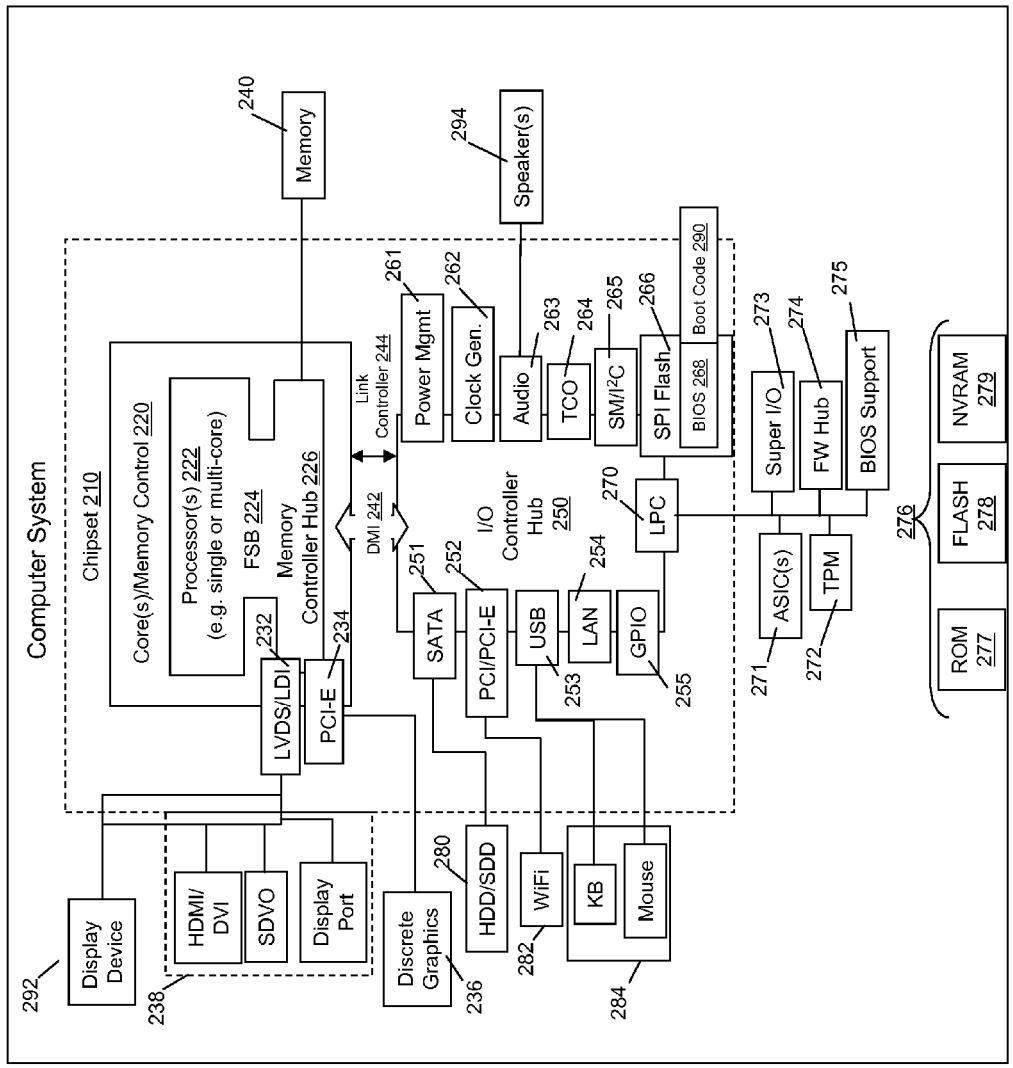
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, and personal computer devices generally. In some cases, certain device circuitry, e.g., that of FIG. 2, will include devices for connecting to a particular communication network, e.g., LAN or WLAN, but not another, e.g., WAN or WWAN. Whereas in other devices, e.g., a smart phone or table, the circuitry (such as that outlined in FIG. 1) includes a WWAN communication capability. An embodiment operates on one or a combination of these devices such that an appropriate available network is utilized to achieve network connectivity for all the user's devices in an automated fashion.

Figure 3:
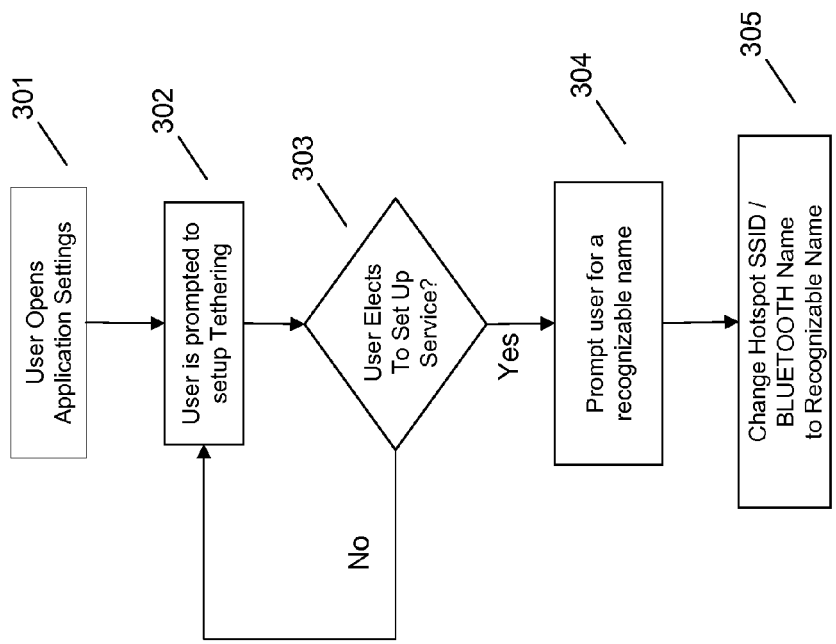
FIG. 3 illustrates an example set up process for a smart phone or like mobile device.

Referring to FIG. 3, an example of a registration or set up process is illustrated. On a first device, e.g., a user's smart phone, a user opens an application user interface to display settings at 301. The application may be integrated into the operating system of the device, e.g., ANDROID operating system, such that the application has super (administrative) user authority or "root" authority. This may be necessary such that the application or service has access to data, e.g., service set identification (SSID) and related passwords in unencrypted form, as further described herein. ANDROID is a registered trademark of Google, Inc., in the United States and other countries.

When the user opens the settings at 301, which may be as simple as opening the application for the first time, the user is prompted or notified to set up the tethering application at 302. If the user selects to set up the application at 303, the tethering application begins to run and asks the user for a name to identify the tethering service at 304, e.g., the user's first name. The user may change the name entered at any point in time. Alternatively, the user need not change the default/system generated name; however, not doing so may complicate the process, as more fully explained herein.

Responsive to the user input of a name identifying the tethering service at 304, the application changes the name of the device's hot spot (e.g., SSID associated with a smart phone) at 305 to the name entered by the user. The application may also change the name of a short range wireless capability of the device (e.g., BLUETOOTH name associated with the smart phone) at 304. The same or different names may be utilized; however, for convenience the user may select or input the same name for each.

Once the user has updated the name(s) of the hot spot and short range wireless services offered by the device, these names will be recognizable to the user and available for later entry or selection, as further described herein. At any time, the user may open the application and settings, e.g., as illustrated at 301, and input a new name and/or password or code for the SSID and/or BLUETOOTH communication services of the device, e.g., smart phone. If so, similar to the input of a name for the first time, this will update a list (e.g., table) of known devices stored in memory, e.g., a memory device of the smart phone or accessible thereto. In the event that the user does update either the names or passwords for the smart phone's SSID and/or BLUETOOTH services, these changes will need to be propagated to other devices wishing to communicate using the same, as further described herein.

Once the user has initiated the service on the first device, e.g., as explained by way of example with reference to a user's smart phone in connection with FIG. 3, the user may set up his or her other device(s) such that they may tether through the service on the first device. By way of example, FIG. 4 outlines a process by which the user may set put another device, e.g., a laptop computer, such that the laptop computer may become a known device to both automatically tether to a WWAN network via the smart phone and/or automatically learn WLAN (e.g., Wi-Fi®) details for connecting to an unknown WLAN, i.e., as informed by the phone.

In an embodiment, a user downloads (or otherwise acquires) a tethering service application for another device, e.g., laptop computer, at 401. Downloading the tethering application is by no means a requirement, as the application or service may be pre-installed or otherwise acquired. However, it is noted here that the user may download the application at 401 in order to illustrate that the tether service version running on the other device of the user (which incidentally becomes "known" to the first device (e.g., smart phone) via the process outlined in FIG. 4 (or like process)) need not have super user or "root" authority and thus need not be integrated into the operating system or otherwise undergo a strict evaluation or quality assurance processing, as per applications obtaining such authority on the device.

The user may then start the tethering application on the known device and the application notifies (e.g., prompts) the user at 402 to start the tethering application on the first device (in this case, his or her smart phone, as per the example of FIG. 3) if the application is not already running on the first device. This is indicated at 403, i.e., the user runs the tether application on the first device, at which point the first device (e.g., smart phone in this example) operates its short range wireless service at 404, e.g., BLUETOOTH service, such that its BLUETOOTH name is broadcast to surrounding devices and/or may be displayed at the first device.

At the other device, i.e., the laptop in this non-limiting example, the application running thereon turns on a short range wireless radio, e.g., BLUETOOTH radio, and scans for other BLUETOOTH devices in the vicinity at 405. This will allow the application to provide a list of in range BLUETOOTH devices at 405. This list will include, by virtue of having the tethering application running on the smart phone, the name entered by the user (or the default name, if no name change was conducted per the example of FIG. 3) for the tethering service. The application version running on the other device (i.e., the laptop in this non-limiting example) will then ask the user to enter or select the name of the tethering service on the smart phone version of the tethering application at 406.

Once the user has successfully entered or provided the name of the smart phone's tethering application, i.e., the name the user selected per the example of FIG. 3, the other device tethering application and the smart phone tethering application pair and connect, e.g., via BLUETOOTH communication (or like suitable short range wireless communication) at 407, 408. This acts to pass control data between the other device (e.g., laptop computer) and the first device (e.g., smart phone) such that a pairing and connection is established. As part of this process, the first device (e.g., smart phone) receives control data including the name of the other device such that this may be stored at 409, e.g., the smart phone stores the short range wireless identification name (e.g., BLUETOOTH name) of the other device it its list of known devices.

Having established a pairing and connection using short range wireless communication, the first device (e.g., smart phone) may share with the known device any control data that is required at 410, e.g., SSID and passwords for known WLANs known to the smart phone, such that these are stored at the known device at 411. Likewise, the known device may send any learned SSIDs/passwords for WLANs to the first device, e.g., since a last synchronization, if any, at 412 such that these are stored by the first device at 413.

Figure 5:
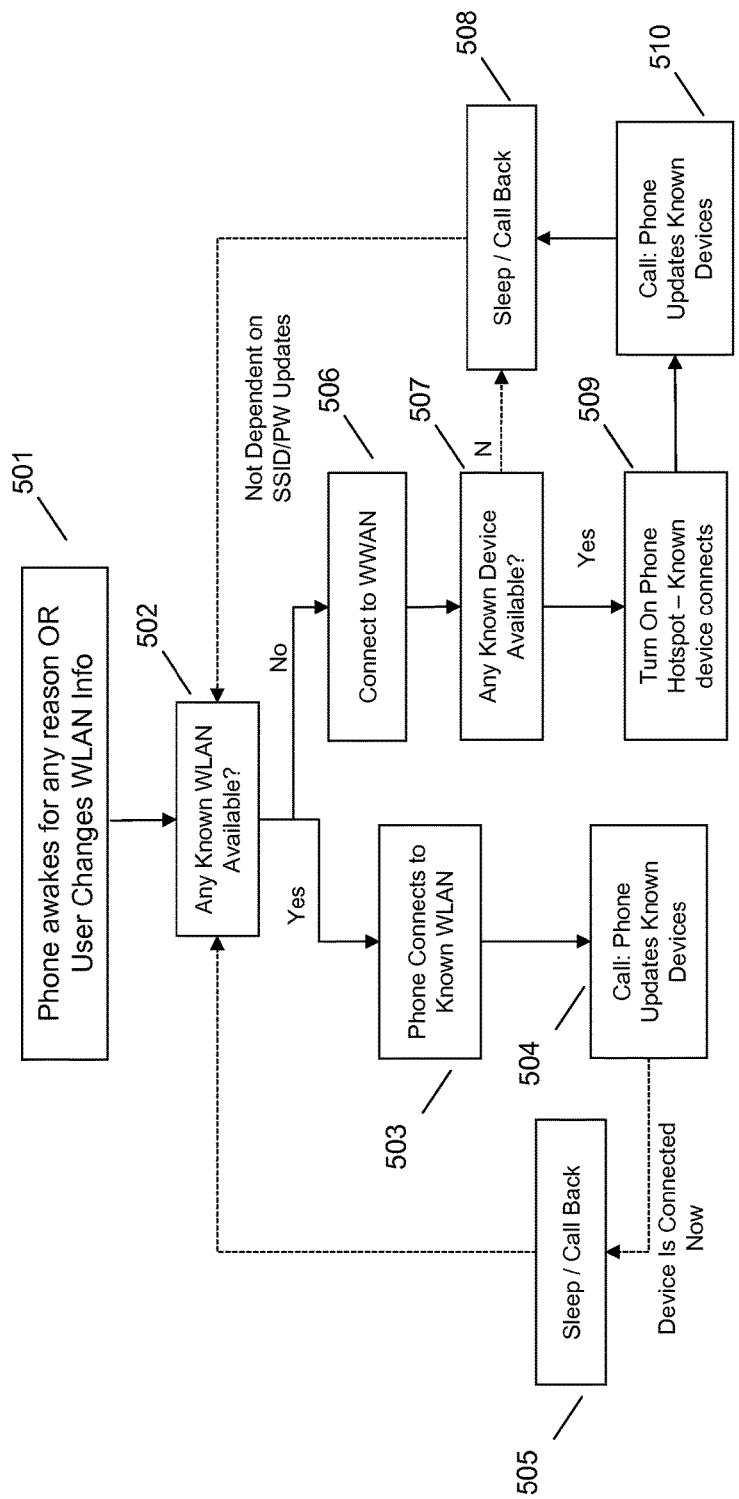
FIG. 5 illustrates an example of tethering and automated synchronization of network connection details.

The initiated first device (e.g., smart phone) and known device(s) (e.g., laptop computer) may now automatically tether to use a WWAN, e.g., as facilitated by the smart phone, as well as update one another of known WLAN connections, e.g., Wi-Fi® SSIDs and passwords learned over time. FIG. 5 illustrates an example of operation to tether a known device using the first device and an example of connecting to a WLAN and updating other devices of connection details regarding the same.

As illustrated in FIG. 5, at a time 501, e.g., a predetermined time and/or according to a policy, such as on first device (e.g., smart phone) waking, a user implemented name change, etc., the first device determines if there is any known WLAN available for connection at 502. This processing may be included to promote connection via WLAN as a preference over WWAN data, as the latter is currently more expensive.

If a WLAN is available, e.g., a Wi-Fi® connection for which the smart phone knows the password, as determined at 502, the smart phone connects to the WLAN at 503 and a call is made at 504 to update the known devices, e.g., using BLUETOOTH wireless or other short range wireless communication. By way of example, if the smart phone is capable of connecting to the WLAN, but the laptop computer (known to the smart phone and in range of a short range wireless communication capability of the smart phone) cannot connect to the WLAN, the smart phone may provide control data in the form of connection details to the laptop computer to connect to the WLAN successfully. This may be performed automatically such that the user need not browse WLAN connection settings and input the data manually. After such control data is passed between devices at 504, the smart phone may sleep the tethering application at 505.

If no known WLAN is available at 502, as determined by the smart phone in this example, an automated tethering process is implemented. By way of example, a connection is made (or maintained) to the WWAN by the smart phone at 506. As described herein, the laptop computer may not be capable of directly connecting to the WWAN (or may not be capable of conveniently connecting to the WWAN). In such a case, the smart phone may tether the laptop to the WWAN, as further described.

Figure 4:
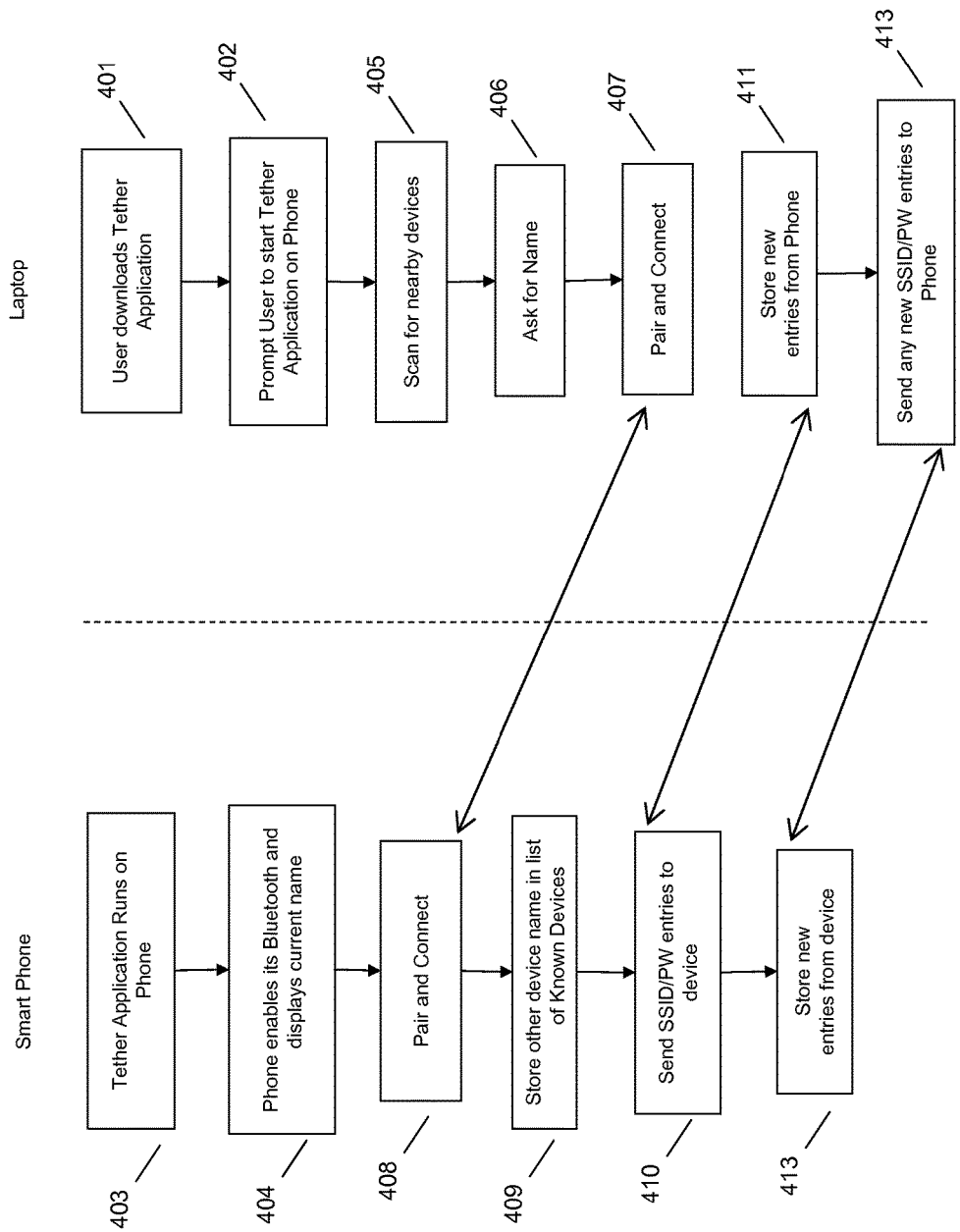
FIG. 4 illustrates an example process for a laptop computer or like mobile device.

The smart phone first determines, e.g., via scanning with a short range wireless communication capability, e.g., BLUETOOTH short range wireless capability, for known devices, e.g., those registered according to a process outlined in FIG. 4. If no known devices are within range, the tethering application may sleep at 507. However, if it is determined that there are one or more known devices detectable by the smart phone's tethering application, as illustrated at 507, an embodiment operates to turn on the smart phone as a hot spot for the known device(s) such that they may connect to the WWAN via the smart phone at 509. This may include transmission of control data via short range wireless communication, e.g., BLUETOOTH communication between the smart phone and laptop computer, such that the laptop computer is apprised that the smart phone is available as a hot spot. This may include, for example, displaying an option on the laptop computer that the phone is available as a WLAN connection. The control data may also automate the tethering process for the user. The control data includes for example connection details for tethering to the WWAN.

After the laptop is tethered to the smart phone and thus the WWAN, the smart phone facilitates network communication for the laptop using its WWAN connection and exchanges data with the laptop computer, e.g., using WLAN communication to act as a hot spot for the laptop computer. Thereafter, the tethering application on the smart phone may update any details (e.g., via storage of network connection details in a table or list) at 508.

The process of updating known devices of available WLAN connections, and synchronizing devices in terms of connection data and details, e.g., as illustrated at 505 of FIG.

Figure 6:
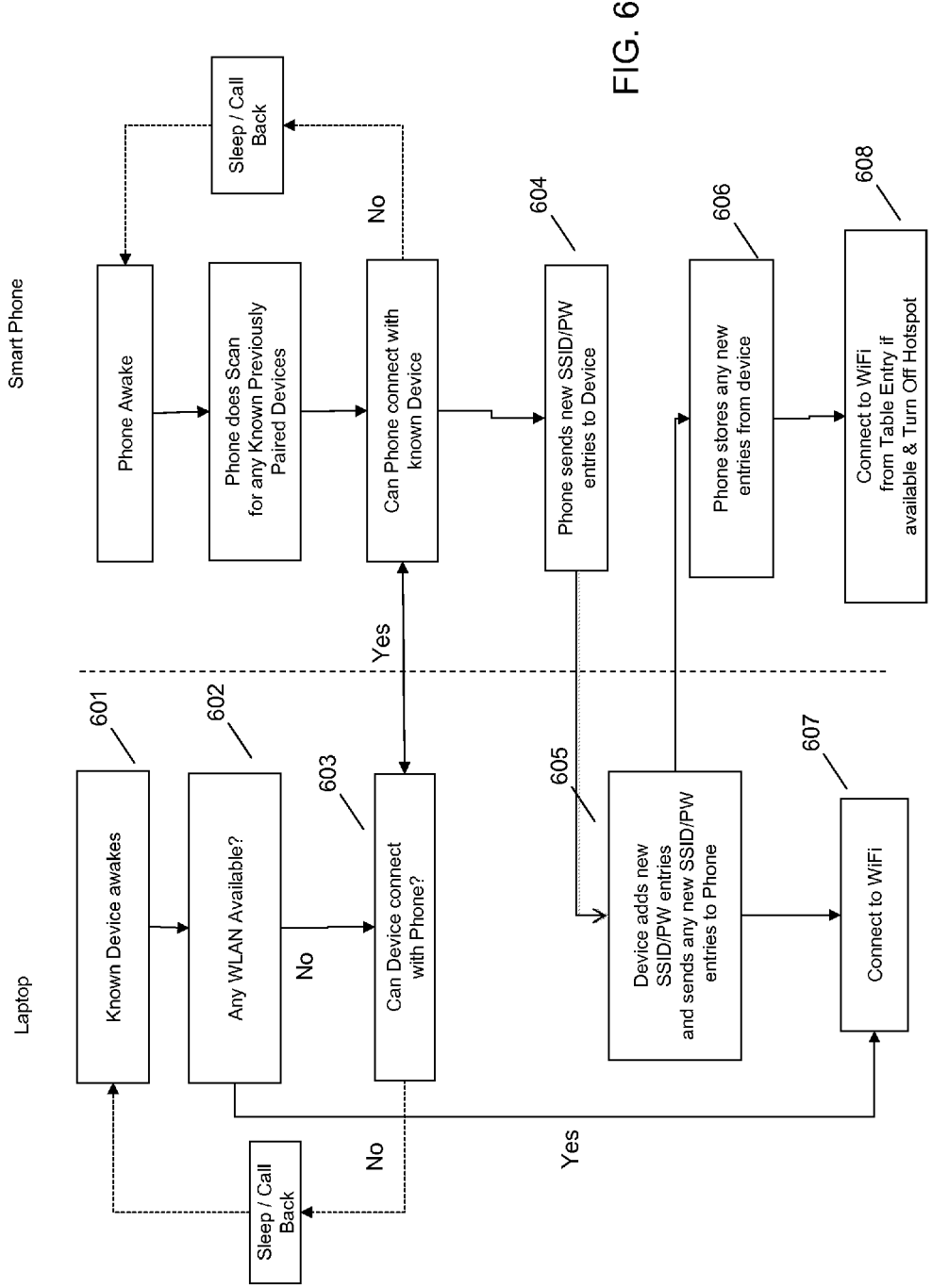
FIG. 6 illustrates an example of sharing network connection details.

5, may be carried out via a synchronization sub-routine, an example of which is outlined in FIG. 6.

In FIG. 6, a known device, e.g., a laptop computer, awakes at 601 and determines, at 602, if there are any known WLAN connections available, e.g., if a previously known Wi-Fi® access point is within range. If so, the known device connects to the WLAN as conventionally known at 607. However, if there are no known WLAN connections available, the known device may determine at 603 if there are any other known devices, e.g., a smart phone of the user, within range of a short range wireless communication capability, e.g., BLUETOOTH communication range.

If so, the known device establishes a short range wireless connection with the smart phone, e.g., establishing a BLUETOOTH connection with a previously paired smart phone. Once connected using a short range wireless capability, the smart phone sends network connection details regarding a WLAN connection that is available and known to the phone, but not the laptop computer at 604. This in turn permits the known device to update its store of WLAN connection data at 605 such that it may establish a connection with the available WLAN at 607, in a similar process to that which the known device would have undertaken had it previously connected with the available WLAN.

The known device may share any available WLAN connection details with the smart phone such that the smart phone may maintain synchronization with the laptop computer, e.g., store the network connection details at 606. The smart phone then may connect to (if it had not already done so) the WLAN itself at 608.

As described herein, use of WWAN tethering may increase the amount of data a user transmits and/or receives via a WWAN account. Accordingly, users at the very least may want to be apprised of their data usage. An embodiment intelligently monitors data usage such that users are aware and proactively involved in their data consumption.

Figure 7:
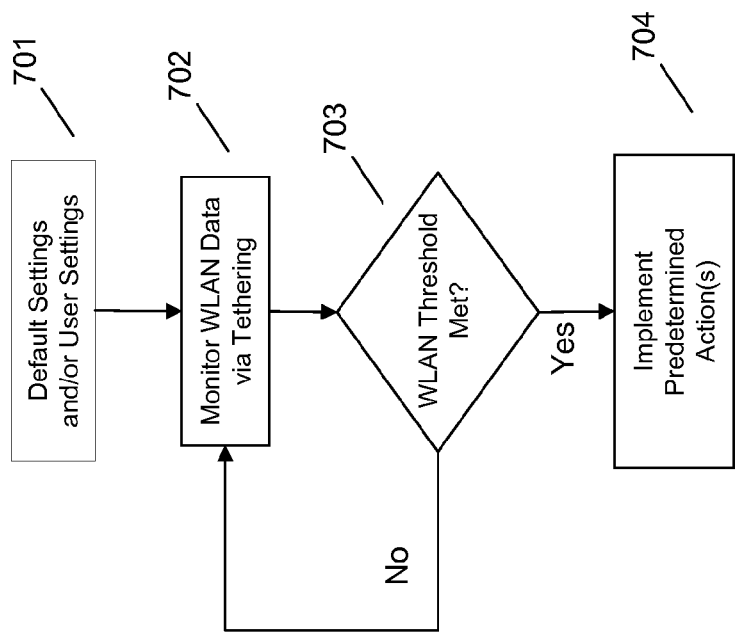
FIG. 7 illustrates an example of distributed network data usage metering.

For example, an embodiment may provide default values for thresholds used to implement actions to manage WWAN data consumption. By way of example, and referring to FIG. 7, an embodiment may set default thresholds for total data usage in a predetermined time at 701, e.g., per month, and/or data usage rate, such that a user does not exceed his or her data plan limits. A user may adjust the thresholds at any time, e.g., in terms of amount and timing (e.g., reset date).

An embodiment may thus monitor at 702 WWAN data usage via an application running on the smart phone, for example, as this is the likely device that tethers the others to the WWAN. If the monitoring at 702 reveals that the WWAN data usage is approaching a predetermined limit or cap, e.g., crosses a threshold lower than the cap (and like thresholds may be used for data consumption rate, etc.), as determined at 703, an embodiment may take one or more predetermined actions at 704.

By way of example, if a data limit threshold is set at 701 (by default or by a user) as "x" GB, the threshold for warning may be set as xGB>Warning Threshold (GB). Likewise, if a predetermined action includes not simply warning the user but proactively terminating a WWAN connection, an embodiment may implement this action at a different threshold, e.g., at or above xGB. Similarly, thresholds for warning, slowing or terminating WWAN data consumption may be set by default and optionally modified by a user such that a warning or other appropriate action takes place, e.g., issuing a warning if data streaming occurs over the WWAN connection at 500 KB/sec for 30 seconds.

The thresholds may take timing into consideration as well. For example, an embodiment may start data monitoring at the start of a billing cycle or may default to start at the first day of each month. A user may wish to be apprised if the tethering has automatically started, as this may impact which types of data they wish to receive and/or transmit. Accordingly, in an embodiment, a device, e.g., a smart phone, may send a notification to each device when tethering is active. This may include a visual notification or indication, e.g., displayed on the phone and/or provided by the device that is tethered.

Accordingly, the various embodiments provide for automated network connection facilitated by a group of two or more user devices working together to establish a network connection. In certain embodiments, this includes establishing a tethering connection in an automated or semi-automated fashion. In an embodiment, devices synchronize their network connection details such that available network details are known to all devices in communication, e.g., via short range wireless communication. Also, an embodiment facilitates user control over tethering such that data usage may be monitored and controlled.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, electromagnetic, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a magnetic storage device, or any suitable combination of the foregoing. In the context of this document, a storage device is not a signal and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

The invention claimed is:

1. A method, comprising:
   determining if a wireless wide area network (WWAN) is available;
   connecting, using a wireless wide area network (WWAN) device a first electronic device to the available WWAN;
   notifying a second electronic device that the first electronic device is available as a hot spot, wherein the second electronic device is registered to participate in tethering with the first electronic device;
   establishing a tethering connection between the first electronic device and the second electronic device;
   determining, using the first electronic device, a data usage value of the second electronic device based on data communicated over the WWAN by the second electronic device; and
   communicating, using the first electronic device, the data usage to the second electronic device.

2. The method of claim 1, further comprising:
   comparing the separate data usage value to a threshold value; and
   taking a predetermined action responsive to the separate data usage value exceeding the threshold value.

3. The method of claim 1, further comprising:
   determining that the another device is communicating data selected from the group consisting of URL data, data of a known type, data communicated using a predetermined protocol, data of a predetermined size, and metadata associated with a URL; and
   taking a predetermined action responsive to determining that the another device is communicating the data.

4. The method of claim 3, wherein the data of a known type is selected from the group consisting of update data, multimedia data, image data and audio data.

5. The method of claim 3, wherein the predetermined action is selected from the group consisting of providing a warning, throttling the data communicated over the WWAN, terminating a WLAN connection, and terminating the WWAN connection.

6. The method of claim 2, wherein the threshold value is a predetermined data amount.

7. The method of claim 2, wherein the threshold value is a predetermined data rate.

8. The method of claim 2, wherein the predetermined action is selected from the group consisting of providing a warning, throttling the data communicated over the WWAN, terminating a WLAN connection, and terminating the WWAN connection.

9. The method of claim 8, wherein the warning is communicated to the another user device.

10. The method of claim 8, wherein the warning is displayed on the user electronic device.

11. The method of claim 1, wherein the threshold value is user modifiable.

12. The method of claim 1, wherein the threshold value is adjusted based on a billing cycle of an account associated with the WWAN connection.

13. The method of claim 1, wherein the determining comprises receiving a data usage value from the another user device.

14. A user electronic device, comprising:
    a processor;
    a wireless wide area network (WWAN) device operatively coupled to the processor;
    a memory device comprising instructions executable by the processor to:
    determine if a wireless wide area network (WWAN) is available;
    connect, using the wireless wide area network (WWAN) device, a first electronic device to the available WWAN;
    notify a second electronic device that the first electronic device is available as a hot spot, wherein the second electronic device is registered to participate in tethering with the first electronic device;
    establish a tether connection between the first electronic device and the second electronic device;
    determine, using the first electronic device, a the data usage value of the second electronic device based on data communicated over the WWAN by the second electronic device; and
    communicate, using the first electronic device, the data usage to the second electronic device.

15. The electronic device of claim 14, wherein the instructions are further executable by the processor to:
    compare the separate data usage value to a threshold value; and
    take a predetermined action responsive to the separate data usage value exceeding the threshold value.

16. The electronic device of claim 14, wherein the instructions are further executable by the processor to:
    determine that the another device is communicating data selected from the group consisting of URL data, data of a known type, data communicated using a predetermined protocol, data of a predetermined size, and metadata associated with a URL; and
    take a predetermined action responsive to determining that the another device is communicating the data.

17. The electronic device of claim 16, wherein the data of a known type is selected from the group consisting of update data, multimedia data, image data and audio data.

18. The electronic device of claim 15, wherein the predetermined action is selected from the group consisting of providing a warning, throttling the data communicated over the WWAN, terminating a WLAN connection, and terminating the WWAN connection.

19. The electronic device of claim 15, wherein the threshold value is a predetermined data amount.

20. The electronic device of claim 15, wherein the threshold value is a predetermined data rate.

21. The electronic device of claim 15, wherein the predetermined action is selected from the group consisting of providing a warning, throttling the data communicated over the WWAN, terminating a WLAN connection, and terminating the WWAN connection.

22. The electronic device of claim 21, wherein the warning is communicated to the another user device.

23. The electronic device of claim 21, wherein the warning is displayed on the user electronic device.

24. The electronic device of claim 14, wherein the threshold value is user modifiable.

25. The method of claim 14, wherein the threshold value is adjusted based on a billing cycle of an account associated with the WWAN connection.

26. A product, comprising:
a storage device having code stored therewith, the code being executable by a processor and the code comprising:
code that determines if a wireless wide area network (WWAN) is available;
code that connects, using a wireless wide area network (WWAN) device, a first electronic device the available WWAN;
code that establishes a tethering connection between the first electronic device and the second electronic device;
code that determines, using a processor of the first electronic device, a data usage value of the second electronic device based on data communicated over the WWAN by the second electronic device; and
code that communicates, using the first electronic device, the data usage to the second electronic device.

* * * * *